(12) United States Patent
Serre (10) Patent No.: US 8,884,314 B1
(45) Date of Patent: Nov. 11, 2014

(54) CIRCUITRY CONFIGURABLE BASED ON DEVICE ORIENTATION

(71) Applicant: Jeffery J. Serre, Peabody, MA (US)

(72) Inventor: Jeffery J. Serre, Peabody, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 67 days.

(21) Appl. No.: 13/891,874

(22) Filed: May 10, 2013

(51) Int. Cl.
*H01L 29/18* (2006.01)
*H01L 33/62* (2010.01)
*H01L 27/15* (2006.01)

(52) U.S. Cl.
CPC ............... *H01L 33/62* (2013.01); *H01L 27/15* (2013.01)
USPC 257/88; 257/99; 257/E33.066; 257/E21.499; 438/28; 438/34

(58) Field of Classification Search
CPC ............ H01L 23/48; H01L 2924/1532; H01L 2224/75; H01L 2924/12041; H01L 2224/04042; H01L 23/52; H01L 2225/06506; H01L 24/78; H01L 33/62; H01L 25/0753
USPC ......... 257/88, 99, E33.066, E21.499; 438/28, 438/34
See application file for complete search history.

(56) References Cited

U.S. PATENT DOCUMENTS

| 5,814,847 | A | 9/1998 | Shihadeh et al. |
| 7,625,780 | B2 | 12/2009 | Jacobs et al. |
| 7,774,929 | B2 | 8/2010 | Jacobs |
| 7,834,364 | B2 * | 11/2010 | Lee ................................ 257/82 |
| 8,067,777 | B2 * | 11/2011 | Fjelstad ......................... 257/88 |

FOREIGN PATENT DOCUMENTS

WO    WO 2006/076614    7/2006

\* cited by examiner

*Primary Examiner* — Minh-Loan Tran
(74) *Attorney, Agent, or Firm* — Robert F. Clark (57) ABSTRACT

The present disclosure is directed to circuitry configurable based on device orientation. Example circuitry may comprise at least one device location and configurable conductors. The at least one device location may include at least two conductive pads onto which a device may be populated by a manufacturing process. The configurable conductors may be coupled to each of the at least two conductive pads. The configurable conductors may be configured by adding conductive material to at least one configurable conductor or subtracting at least part of at least one configurable conductor. For example, conductive material may be added to close a space between two segments of a configurable conductor to form a conduction path. Alternatively, at least part of at least one of a plurality of configurable conductors coupled to a conductive pad may be subtracted (e.g., cut) to stop conduction in the at least one configurable conductor.

19 Claims, 5 Drawing Sheets

CIRCUITRY CONFIGURABLE BASED ON DEVICE ORIENTATION

TECHNICAL FIELD

The present invention relates to electronic assembly, and more specifically, to the placement of devices into circuitry that may be configurable based on device orientation.

BACKGROUND

In a typical electronics manufacturing process, circuitry including, but not limited to, printed circuit boards, flexible substrates, packages such as multichip modules (MCM), etc. may be populated with electronic devices using pick-and-place operations. For example, the circuitry may be routed through machines equipped with vision systems for identifying device placement locations in the circuitry and manipulators configured to pick up devices from a supply location (e.g., rail, reel, etc.) and place the devices into the previously identified device locations. Pick-and-place manufacturing has been effective at least from the standpoint of accurately populating circuitry with a variety of devices at a speed substantially faster than manual device insertion.

However, applications are now emerging wherein circuitry may need to be populated with high volumes of the same device. For example, recent developments in light emitting diode (LED) technology have created substantial demand for LED-based light sources due to their high quality light, low power consumption and long life. Manufacturing large-scale LED lighting (e.g., for commercial or professional use) may involve populating circuitry with thousands of the same LED. While pick-n-place manufacturing can do the job, high machine time and upkeep costs, limited production speed, etc. for performing such simple/repetitive assembly can be prohibitive.

Electronic manufacturing methods better suited for high volume production are now in development. For example, fluidic self-assembly (FSA) is a manufacturing method that relies upon the wetting behavior of liquids (e.g., solder) to populate circuitry. For example, electronic components (e.g., LED die) may be assembled by drawing a circuit substrate through an agitated liquid bath. The liquid bath may be heated above the melting point of solder that has been pre-printed on the circuit board. Due to the agitation, bond pads on the components may randomly contact the molten solder on the circuit substrate, at which point the solder provides enough wetting and lubrication for the components to naturally find their device locations (e.g., their minimum energy configuration). In particular, the wetting effect of the melted solder may cause conductive pads or bumps on the devices to be drawn to conductive pads in the device locations. While FSA may provide a method by which circuitry may be populated with a large number of devices, at least one issue still exists in regard to device orientation in the circuitry. Currently no effective provisions exist to control the orientation of devices being populated into the circuitry. For example, existing control measures require custom devices and/or circuitry to mechanically steer device orientation, which may be prohibitive due to substantially increased material costs.

BRIEF DESCRIPTION OF THE DRAWINGS

Reference should be made to the following detailed description which should be read in conjunction with the following figures, wherein like numerals represent like parts.

Although the following Detailed Description will proceed with reference being made to illustrative embodiments, many alternatives, modifications and variations thereof will be apparent to those skilled in the art.

DETAILED DESCRIPTION

As referenced herein, "circuitry" may comprise any substrate onto which electronic devices may be inserted, placed, populated, etc. Examples of circuitry may include, but are not limited to, circuit boards, flexible substrates, packages such as multichip modules (MCM), etc. In general, circuitry may "configurable" consistent with embodiments of the present disclosure in that conductors in the circuitry may be configurable based on, for example, the orientation of devices populated into the circuitry. Configuring conductors may comprise, for example, adding conductive material to at least one conductor or removing at least part of at least one conductor. Adding conductive material may bridge a space existing between at least two sections of a conductor (e.g., to form a conductive path between the segments), and removing at least part of a conductor may be used to create an open circuit in a conductor (e.g., to stop conduction in the at least one conductor). For example, devices may be populated into circuitry and a determination may then be made as to the orientation of each device. Based on the orientation, conductors may then be configured to account for the device orientation. In one embodiment, the devices may be LEDs and the configuration may be to couple the LEDs in series regardless of their actual orientation.

In one embodiment, circuitry may comprise, for example, at least one device location and configurable conductors. The at least one device location may include at least two conductive pads onto which a device may be populated by a manufacturing process. The configurable conductors may be coupled to each of the at least two conductive pads. The configurable conductors may be configured by adding conductive material to at least one configurable conductor or subtracting at least part of at least one configurable conductor.

The manufacturing process may be, for example, a FSA process. The configurable conductors may be configured based on an orientation of the device populating the at least one device location. In one example implementation the device may be a LED, the circuitry may comprise a plurality of LEDs and the configurable conductors may be configurable to couple the plurality of LEDs in series based on the orientation of each LED.

In one embodiment, the at least one configurable conductor may comprise at least two segments separated by a space, the at least two segments being configurable to form a conductive path by adding the conductive material to bridge the space. The conductive material may be, for example, conductive ink applied to the circuitry after the manufacturing process. Alternatively, a plurality of configurable conductors may be coupled to each of the at least two conductive pads, and subtracting at least part of the at least one configurable conductor may comprise cutting a space in at least one of the plurality of configurable conductors, the space stopping conduction in the at least one configurable conductor. Cutting the space may comprise, for example, removing part of the circuitry by at least one of laser cutting, hole punching or drilling the circuitry after the manufacturing process. An example method consistent with embodiments of the present disclosure may comprise populating circuitry with at least one device via a manufacturing process, the circuitry including at least one device location having at least two conductive pads, determining an orientation for the at least one device, and configuring conductors in the circuitry based on the orientation by at least one of adding conductive material to at least one conductor or subtracting at least part of at least one conductor.

Figure 1:
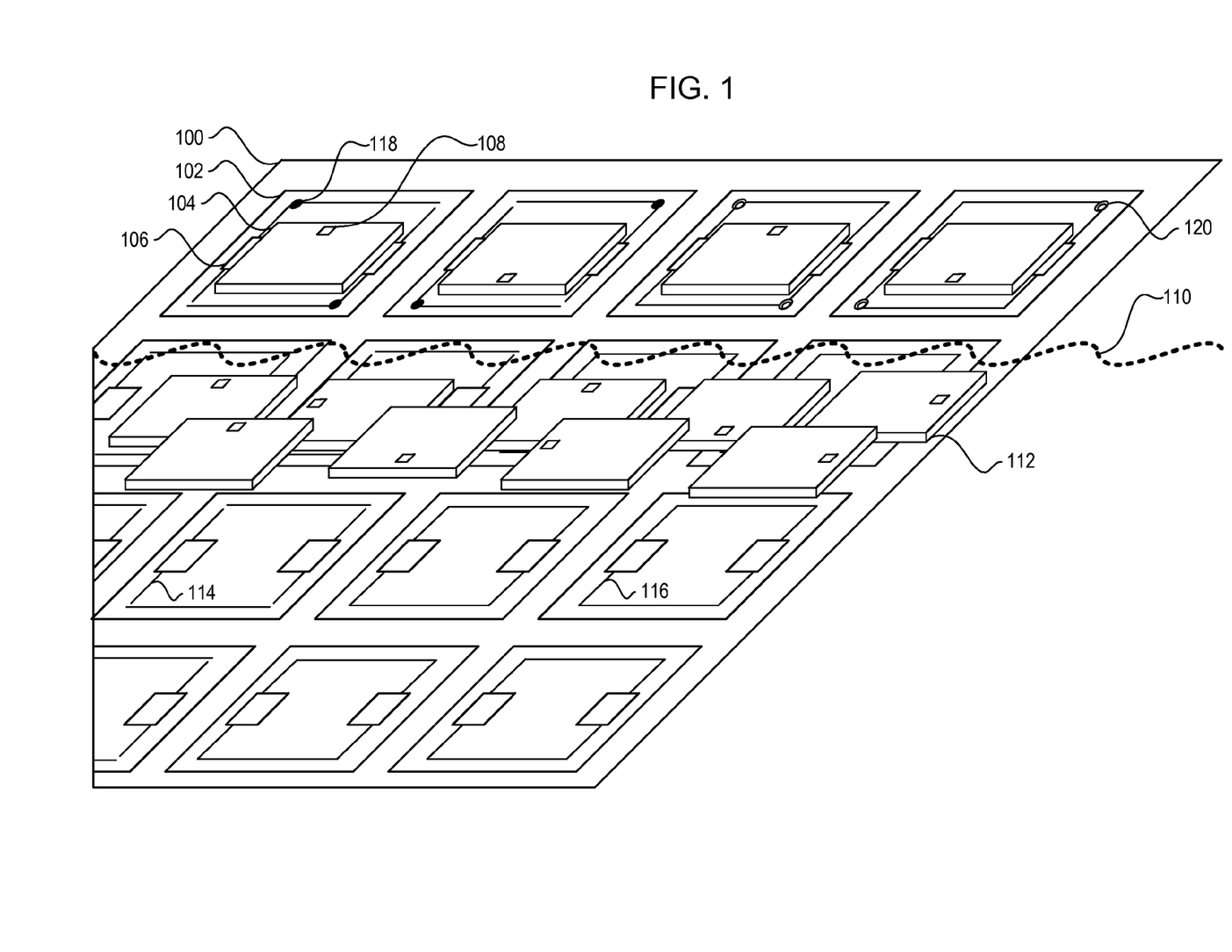
FIG. 1 illustrates example circuitry configurable based on device orientation consistent with the present disclosure.

Now referring to FIG. 1, example circuitry configurable based on device orientation consistent with the present disclosure is shown. Initially, it is important to note that the example illustrated in FIG. 1 is merely for the sake of explanation herein, and is not intended to limit any embodiments of the present disclosure to a required implementation. Various embodiments of the present disclosure may employ alternative materials, layouts, manufacturing processes, etc. and still be considered within the scope of the systems, methods, teachings, etc. disclosed herein.

In FIG. 1, Circuitry 100 may comprise, for example, device locations 102 into which devices 104 may be inserted, placed, populated, etc. Device locations 102 may include at least two conductive pads 106. Conductive pads 106 may include solder pads, bumps, etc., and may correspond to conductive pads on devices 104 (not shown) that allow device 104 to be at least electronically coupled to circuitry 100. The number of conductive pads 106 in device locations 102 is not limited to only two, and the actual number of conductive pads 106 may be application specific. For example, in instances where circuitry 100 is being populated with LEDs only two conductive pads 106 are necessary. However, some devices 104 may comprise more complex (e.g., higher pin count) interfaces, and thus, may require more than two conductive pads 106.

With only two conductive pads 106, devices 104 may be mounted in device locations 102 in two different orientations. Landmarks 108 may always occur on devices 104 in the same place, and have been utilized herein to demonstrate device orientation. For example, landmarks 108 may illustrate that devices 104 can be mounted in an upward orientation (e.g., with landmark 108 pointing upward) and a downward orientation (e.g., with landmark 108 pointing downward). The example of FIG. 1 further illustrates how a FSA process may be used to populated circuitry 100 with devices 104. For example, circuitry 100 may be submerged in liquid 110 along with a plurality of loose devices as shown at 112. Liquid 110 may be agitated to help facilitate moving loose devices 112 to device locations 102, and may be heated to melt solder previously applied to conductive pads 106 in circuitry 100. As circuitry 100 is withdrawn from liquid 110, the conductive pads of loose devices 112 may adhere to the molten solder on conductive pads 106, and thus, loose devices 112 may become populated devices 104. However, as loose devices 112 float freely in agitated liquid 110 their orientation may change frequently. Thus, the orientation of loose devices 112 when populated may vary between the upward and downward orientation.

To accommodate variable orientation, each device location 102 may further comprise configurable conductors, two examples of which are shown at 114 and 116. More specifically, the examples shown at 114 and 116 in FIG. 1 demonstrate different architectures and operations that may be used to achieve similar results. The choice of one type of configurable architecture over the other may be based on, for example, circuitry configuration, manufacturing capabilities, end product usage environment, etc. In one embodiment, each open configurable conductor 114 may comprise at least two segments separated by a space interrupting conduction. A conductive path may then be formed in open configurable conductor 114 by adding conductive material 118 bridging the space. Examples of conductive material 118 may comprise conductive ink, paint, etc. that are painted, sprayed, etc. across the space. Application of conductive material 118 may occur, for example, after device locations 102 have been populated by loose devices 112 (e.g., via FSA). Alternatively, a plurality of closed configurable conductors 116 may be coupled to each conductive pad 106. During configuration, at least part of at least one closed configurable conductor 116 may be subtracted from circuitry 100 as demonstrated by holes 120, creating a space that stops conduction in the at least one closed configurable conductor 116. Through the addition of conductive material or the subtraction of part of at least one conductor, the electronic coupling of device 104 to circuitry 100 may be configured (e.g., based on device orientation).

Figure 2:
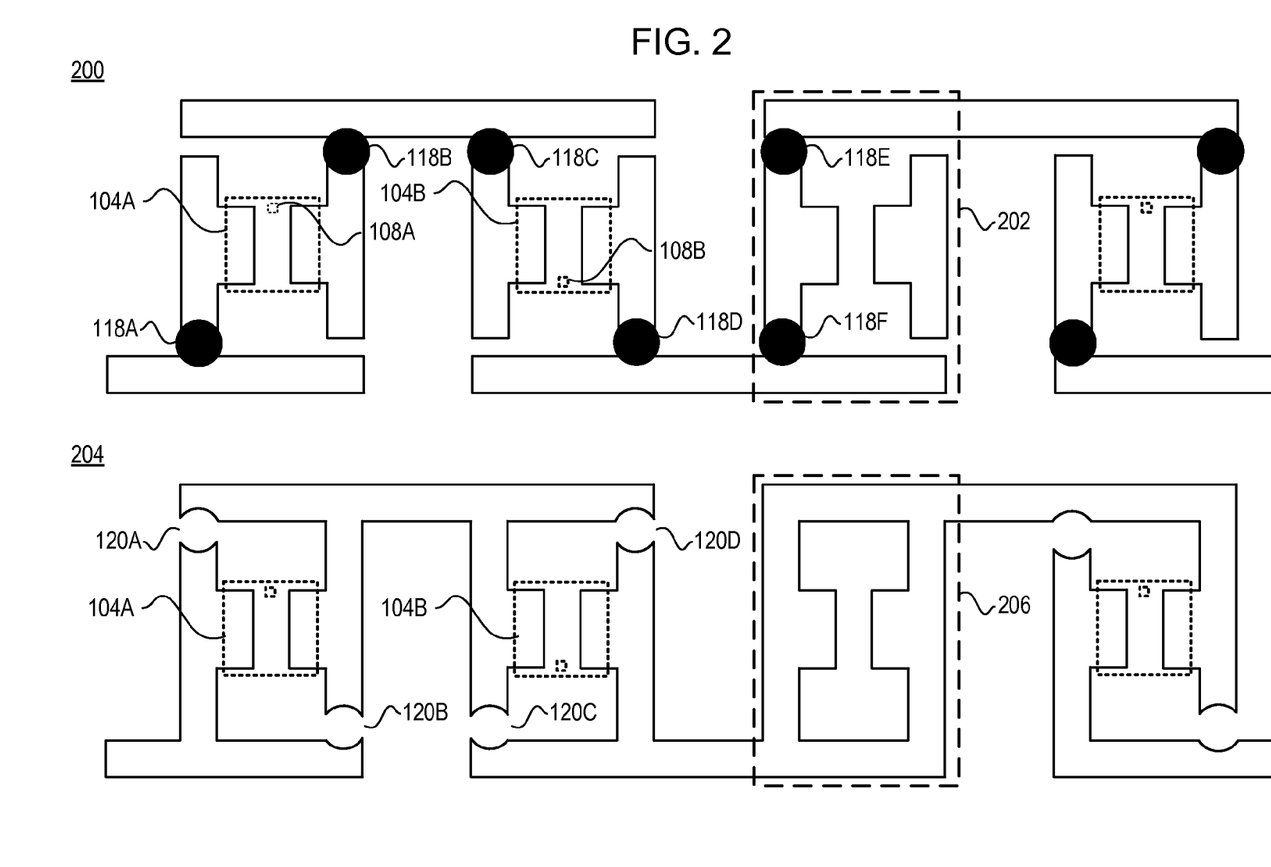
FIG. 2 illustrates example circuitry and circuitry configuration methods consistent with the present disclosure.

FIG. 2 illustrates example circuitry and circuitry configuration methods consistent with the present disclosure. A first example illustrating the configuration of open configurable conductors 114 is shown at 200. Device 104A may be oriented in an upward position as shown by the position of landmark 108A. This device orientation may dictate that conductive material be added as shown at 118A and 118B to couple the left-hand conductor to the bottom rail and the right-hand conductor to the top rail. However, the orientation of device 104B is reversed (e.g., landmark 108B shows the device is oriented downward). Based on the orientation of device 104B, conductive material may instead be added as shown at 118C and 118D wherein the left-hand conductor is coupled to the top rail and the right-hand conductor to the bottom rail.

Illustrated within example 200 is another situation 202 wherein a device location 102 is not populated following assembly (e.g., via FSA). In some applications this omission may not be problematic because 100% population of circuitry 100 is unnecessary. For example, in LED-based commercial or industrial lighting less than 100% population may be acceptable because the impact of a missing LED on light quality may be negligible. In such an instance the objective may be to ensure that a series circuit configuration is maintained even in the absence of a device 104. In example situation 200, additional material may be added as shown at 118E and 118F to couple the top rail to the bottom rail, and thus, continue the series circuit to the next device location 102.

Example 204 is similar to example 200 but using closed configurable conductors 116. In this instance, parts of closed configurable conductors 116 may be removed to stop conduction based on device orientation. Examples of parts of closed configurable conductors 116 that have been removed are shown at 120A and 120B for device 104A in an upward orientation, and at 120C and 120D for device 104B in a downward orientation. The removal of part of closed conductors 116 may be performed using any cutting, drilling, punching operation that is precise enough to remove only a small part of the conductor (e.g., to form a space stopping conduction) without affecting the rest of circuitry 100, and may include, for example, laser cutting, hole punching, etc. In example 204 parts of the conductor are being removed to stop conduction, as opposed to adding conductive material to form a conduction path in example 200. As a result, holes 120 in example 204 are shown in an opposite configuration to material additions 118 shown in example 200. Moreover, in the example shown at 206 where device location 102 has not been populated, no modifications are needed to closed configurable conductors 116 since the series is maintained.

Figure 3:
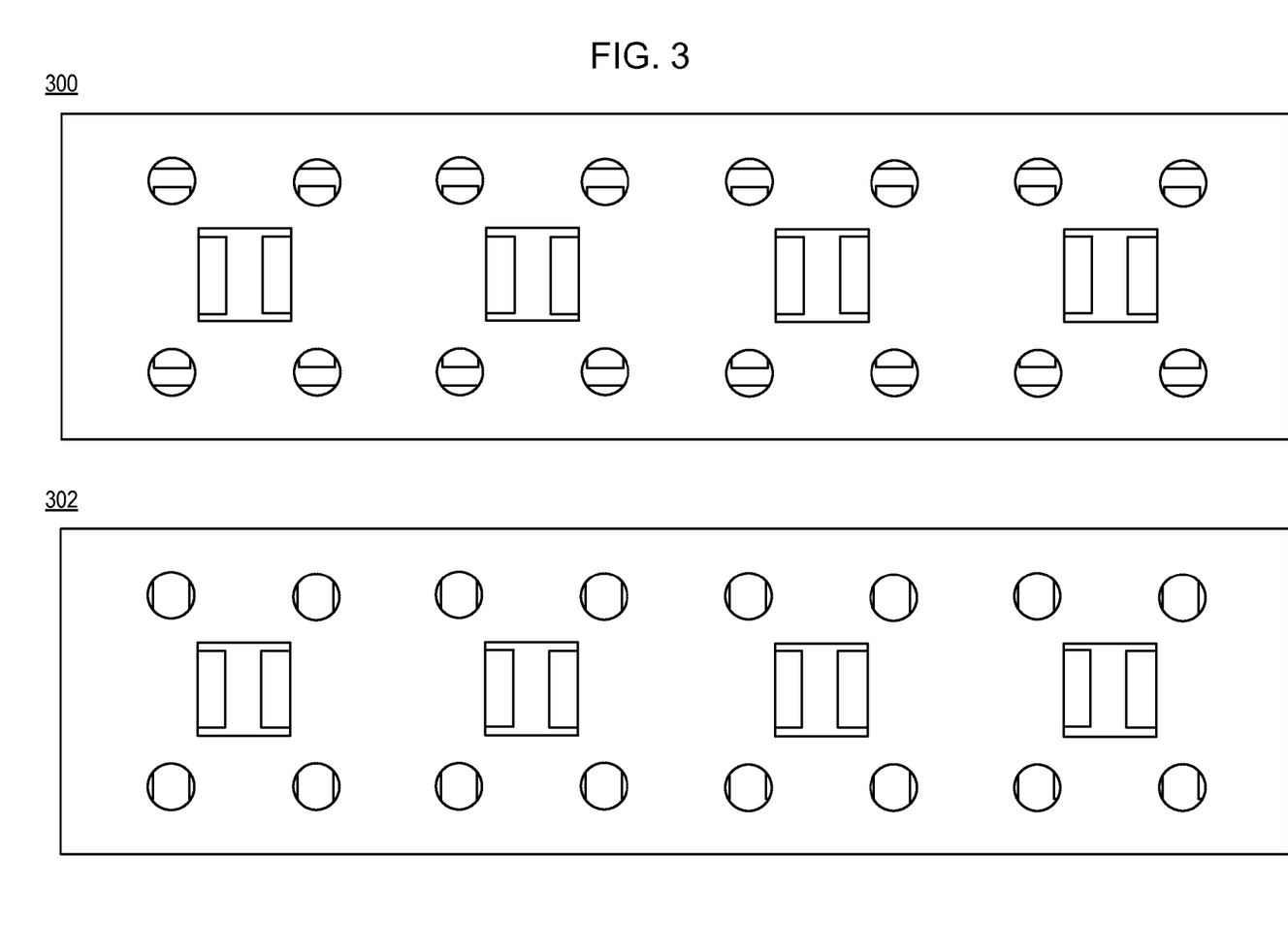
FIG. 3 illustrates example circuitry masking consistent with the present disclosure.

FIG. 3 illustrates example circuitry masking consistent with the present disclosure. In FSA, or similar solder-based reflux processes, solder masks may be required to ensure that solder is only applied to the areas of circuitry 100 where devices 104 are being populated. However, in embodiments consistent with the present disclosure areas where conductive material may later be applied may also be left exposed as shown in example 300, and alternatively, areas where parts of closed configurable conductors 116 may later be removed may also be left exposed as shown in example 302. In this manner, circuitry 100 may later be configured based on a determination of the orientation of each device 104 populated into each device location 102. In the same or a different embodiment, a determination may also be made as to whether any device locations 102 are unpopulated. These locations may be manually populated, or if empty device locations 102 are permissible, may be left vacant and configured as shown in examples 202 and 206 of FIG. 2.

Figure 4:
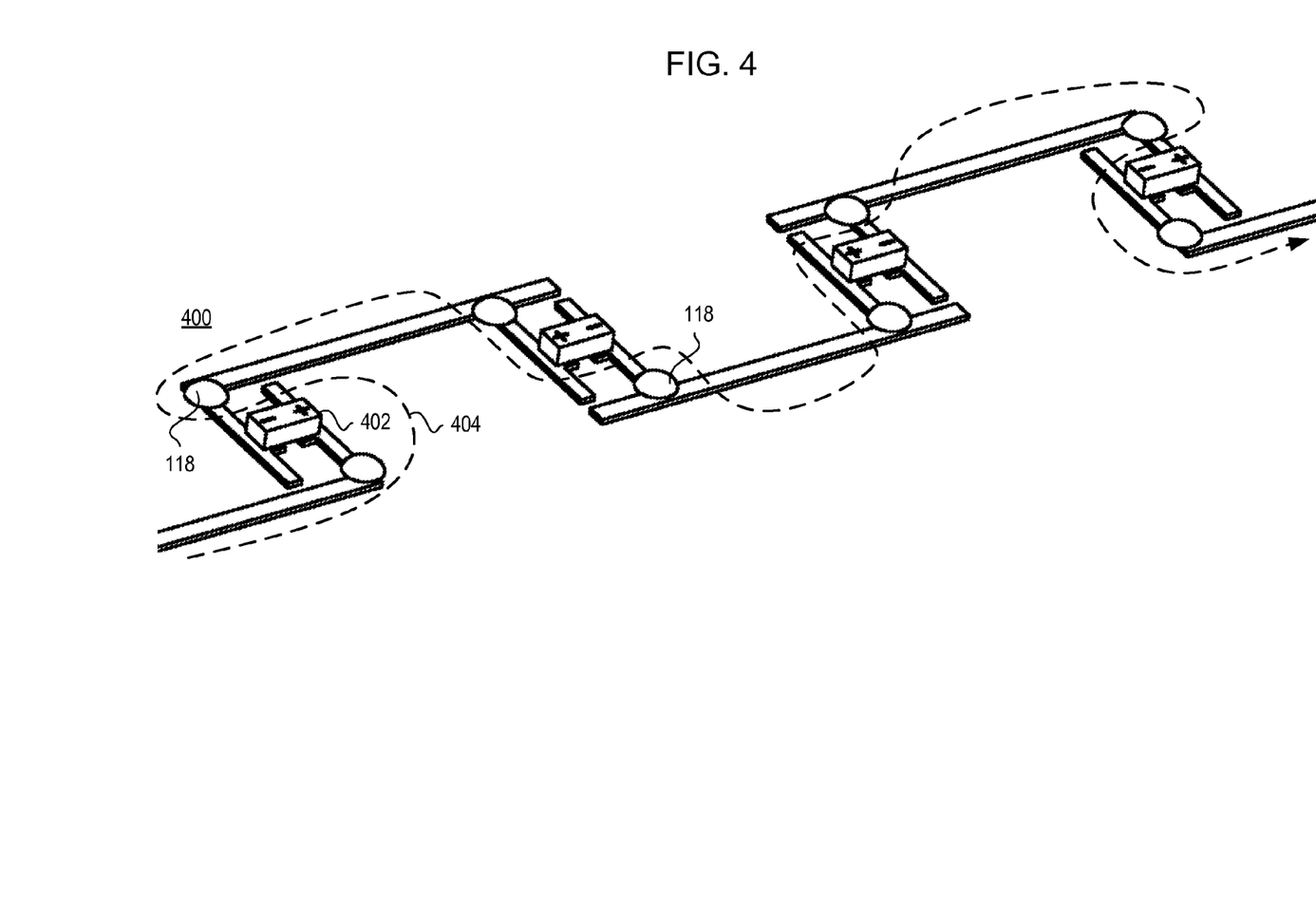
FIG. 4 illustrates an example application of circuitry configurable based on device orientation consistent with the present disclosure.

FIG. 4 illustrates an example application of circuitry configurable based on device orientation consistent with the present disclosure. Example 400 discloses a string of LEDs 402 that are coupled in series based on the application of additional conductive material 118. As shown by conduction path line 404, the application of additional material 118 at strategic places in circuitry 100 may keep all of the LEDs 402 forward biased (e.g., with a current flowing from the positive terminal in LED 402 to the negative terminal in LED 402) regardless of the physical orientation of LEDs 402. In this manner, LEDs 402 may be populated into circuitry 100 using a process like FSA without having to worry about the orientation of LEDs 402 during population.

Figure 5:
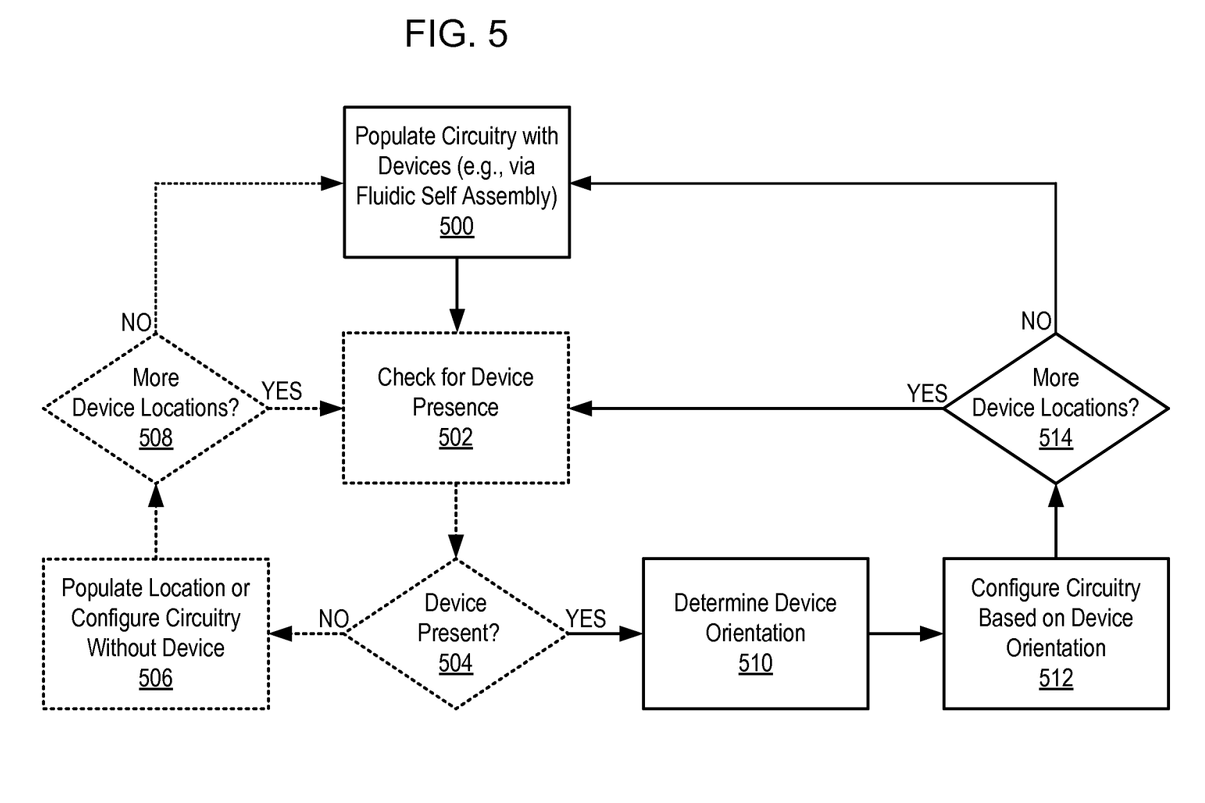
FIG. 5 illustrates example operations for performing electronic assembly using circuitry configurable based on device orientation consistent with the present disclosure.

FIG. 5 illustrates example operations for performing electronic assembly using circuitry configurable based on device orientation consistent with the present disclosure. In operation 500, circuitry may be populated with at least one device. The population of devices into the circuitry may be done using a variety of automated processes including, for example, FSA. Operations 502 to 508 may be optional in that they may only be applicable to situations where there is a possibility of missing devices after population (e.g., in the instance where an assembly process like FSA is employed). Moreover, in one embodiment operations 502 to 510 may be performed on each device location in the circuitry (e.g., on a location-to-location basis).

In operation 502 a check may be performed to determine whether a device is present in a device location. A determination may then be made in operation 504 as to whether a device is present. The determination of device presence may be performed, for example, automatically by a machine vision system including at least a camera, electrical testing applied at the device location, light/dark testing (e.g., detecting light shining through a hole where the device should reside), etc. If in operation 504 it is determined that a device is not present, then in operation 506 the device location may be populated via a rework or manual process, or alternatively, the device location may be configured for operation without a device. Configuring the device location for operation without a device may include, for example, applying conductive material to an open configurable conductor to maintain conduction in the circuitry without the device. Conduction without a device may not require additional configuration for closed configurable conductors. A determination may then be made in operation 508 as to whether there are more device locations to check. If in operation 508 it is determined that more device locations need to be checked, then the next device location may be checked in operation 502. If in operation 508 it is determined that all of the device locations in the circuitry have been checked, operation 508 may be followed by a return to operation 500 in preparation for the next circuitry to be populated.

If in operation 504 it is determined that a device is present at the device location, then in operation 510 device orientation may be determined. The orientation of the device may be determined using the same or similar equipment to that mentioned above in regard to presence checking. After orientation has been determined, the circuitry may be configured based on the device orientation in operation 512. For example, conductive material may be added to at least one configurable conductor in the circuitry based on the device orientation, or alternatively, at least part of at least one configurable conductor in the circuitry may be removed based on the device orientation. A determination may then be made in operation 514 as to whether there are more device locations to check. If in operation 514 it is determined that more device locations remain, then the next device location may be checked in operation 502. If in operation 514 it is determined that all of the device locations in the circuitry have been checked, operation 514 may be followed by a return to operation 500 in preparation for the next circuitry to be populated.

While FIG. 5 illustrates various operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to circuitry configurable based on device orientation. Example circuitry may comprise at least one device location and configurable conductors. The at least one device location may include at least two conductive pads onto which a device may be populated by a manufacturing process. The configurable conductors may be coupled to each of the at least two conductive pads. The configurable conductors may be configured by adding conductive material to at least one configurable conductor or subtracting at least part of at least one configurable conductor. For example, conductive material may be added to close a space between two segments of a configurable conductor to form a conduction path. Alternatively, at least part of at least one of a plurality of configurable conductors coupled to a conductive pad may be subtracted (e.g., cut) to stop conduction in the at least one configurable conductor.

According to one aspect there is provided circuitry. The circuitry may include a at least one device location including at least two conductive pads onto which a device may be populated by a manufacturing process, and configurable conductors coupled to each of the at least two conductive pads, the configurable conductors being configured by adding conductive material to at least one configurable conductor or subtracting at least part of at least one configurable conductor.

According to another aspect there is provided a method. The method may include populating circuitry with at least one device via a manufacturing process, the circuitry including at least one device location having at least two conductive pads, determining an orientation for the at least one device, and configuring conductors in the circuitry based on the orientation by at least one of adding conductive material to at least one conductor or subtracting at least part of at least one conductor.

According to another aspect there is provided at least one machine-readable storage medium. The at least one machine-readable storage medium may have stored thereon, individually or in combination, instructions that when executed by one or more processors result in the following operations comprising populating circuitry with at least one device via a manufacturing process, the circuitry including at least one device location having at least two conductive pads, determining an orientation for the at least one device, and configuring conductors in the circuitry based on the orientation by at least one of adding conductive material to at least one conductor or subtracting at least part of at least one conductor.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. Circuitry, comprising:
at least one device location including at least two conductive pads onto which a device may be populated by a manufacturing process; and
configurable conductors coupled to each of the at least two conductive pads, the configurable conductors being configured by adding conductive material to at least one configurable conductor or subtracting at least part of at least one configurable conductor.

2. The circuitry according to claim 1, wherein the manufacturing process is a fluidic self-assembly (FSA) process.

3. The circuitry according to claim 1, wherein the configurable conductors are configured based on an orientation of the device populating the at least one device location.

4. The circuitry according to claim 3, wherein the device is a light emitting diode (LED), the circuitry comprises a plurality of LEDs and the configurable conductors are configurable to couple the plurality of LEDs in series based on the orientation of each LED.

5. The circuitry according to claim 1, wherein the at least one configurable conductor comprises at least two segments separated by a space, the at least two segments being configurable to form a conductive path by adding the conductive material to bridge the space.

6. The circuitry according to claim 5, wherein the conductive material is conductive ink applied to the circuitry after the manufacturing process.

7. The circuitry according to claim 1, wherein a plurality of configurable conductors are coupled to each of the at least two conductive pads, and subtracting at least part of the at least one configurable conductor comprises cutting a space in at least one of the plurality of configurable conductors, the space stopping conduction in the at least one configurable conductor.

8. The circuitry according to claim 7, wherein cutting the space comprises removing part of the circuitry by at least one of laser cutting, hole punching or drilling the circuitry after the manufacturing process.

9. The circuitry according to claim 1, wherein the circuitry comprises a plurality of device locations and each device location has two conductive pads.

10. The circuitry according to claim 9, wherein the device is a light emitting diode (LED), the circuitry comprises a plurality of LEDs and the configurable conductors are configurable to couple the plurality of LEDs in series based on the orientation of each LED.

11. The circuitry according to claim 10, wherein at least one LED has an orientation that is reversed in relation to at least one other LED.

12. A method, comprising:
populating circuitry with at least one device via a manufacturing process, the circuitry including at least one device location having at least two conductive pads;
determining an orientation for the at least one device; and
configuring conductors in the circuitry based on the orientation by at least one of adding conductive material to at least one conductor or subtracting at least part of at least one conductor.

13. The method according to claim 12, wherein the at least one device is a light emitting diode (LED), the circuitry comprises a plurality of LEDs and the conductors are configurable to couple a plurality of LEDs in series based on the orientation of each LED.

14. The method according to claim 12, wherein the manufacturing process is a fluidic self-assembly (FSA) process.

15. The method according to claim 12, further comprising:
checking for device presence prior to determining an orientation for the at least one device; and
configuring the conductors to maintain conduction in the circuitry if it is determined that a device is not present.

16. The method according to claim 12, wherein the at least one conductor comprises at least two segments separated by a space, the at least two segments being configurable to form a conductive path by adding the conductive material to bridge the space.

17. The method according to claim 12, wherein a plurality of conductors are coupled to each of the at least two conductive pads, and subtracting at least part of the at least one conductor comprises cutting a space in at least one of the plurality of conductors, the space stopping conduction in the at least one conductor.

18. At least one machine-readable storage medium having stored thereon, individually or in combination, instructions that when executed by one or more processors result in the following operations comprising:
populating circuitry with at least one device via a manufacturing process, the circuitry including at least one device location having at least two conductive pads;
determining an orientation for the at least one device; and
configuring conductors in the circuitry based on the orientation by at least one of adding conductive material to at least one conductor or subtracting at least part of at least one conductor.

19. The medium according to claim 18, wherein the at least one device is a light emitting diode (LED), the circuitry comprises a plurality of LEDs and the conductors are configurable to couple a plurality of LEDs in series based on the orientation of each LED.

\* \* \* \* \*